United States Patent [19]

Rognon

[11] Patent Number: 4,665,689
[45] Date of Patent: May 19, 1987

[54] EXHAUST SYSTEM FOR THE COMBUSTION GASES OF AN INTERNAL COMBUSTION ENGINE

[76] Inventor: Armand Rognon, 02380 Coucy le Chateau, Verneuil Sous Coucy, Auffrique, (Aisne), France

[21] Appl. No.: 795,162

[22] Filed: Nov. 5, 1985

[30] Foreign Application Priority Data

Nov. 12, 1984 [FR] France ................. 84 17193

[51] Int. Cl.[4] ............... F01N 3/02; G01N 15/08
[52] U.S. Cl. ............................. 60/277; 60/295;
  60/311; 73/38; 73/115; 374/143
[58] Field of Search .......... 60/311, 295, 274, 277;
  73/38, 115, 714; 374/143

[56] References Cited

U.S. PATENT DOCUMENTS

| 3,255,631 | 6/1966 | Franks | 374/143 |
|---|---|---|---|
| 3,910,040 | 10/1975 | Garcea | 60/288 |
| 4,211,124 | 7/1980 | Ng | 374/143 |
| 4,492,079 | 1/1985 | Takagi | 73/38 |
| 4,538,411 | 9/1985 | Wade | 60/274 |

FOREIGN PATENT DOCUMENTS

| 2951621 | 7/1981 | Fed. Rep. of Germany . | |
| 3238686 | 3/1984 | Fed. Rep. of Germany . | |
| 1498492 | 9/1967 | France . | |
| 2492455 | 9/1984 | France . | |
| 221415 | 12/1984 | Japan | 60/295 |
| 2134408 | 8/1984 | United Kingdom . | |

*Primary Examiner*—Douglas Hart
*Attorney, Agent, or Firm*—Stevens, Davis, Miller & Mosher

[57] ABSTRACT

An exhaust system for the combustion gases of an internal combustion engine is provided comprising a pressure sensor detecting the increase of the back pressure of the gases inside an exhaust manifold of an internal combustion engine, which back pressure results from the clogging up of a first flameproof stack, or any other device of this type, for discharging the gases. The pressure sensor communicates with the exhaust manifold through a second flame proof stack placed outside the discharge path of the combustion gases.

6 Claims, 1 Drawing Figure

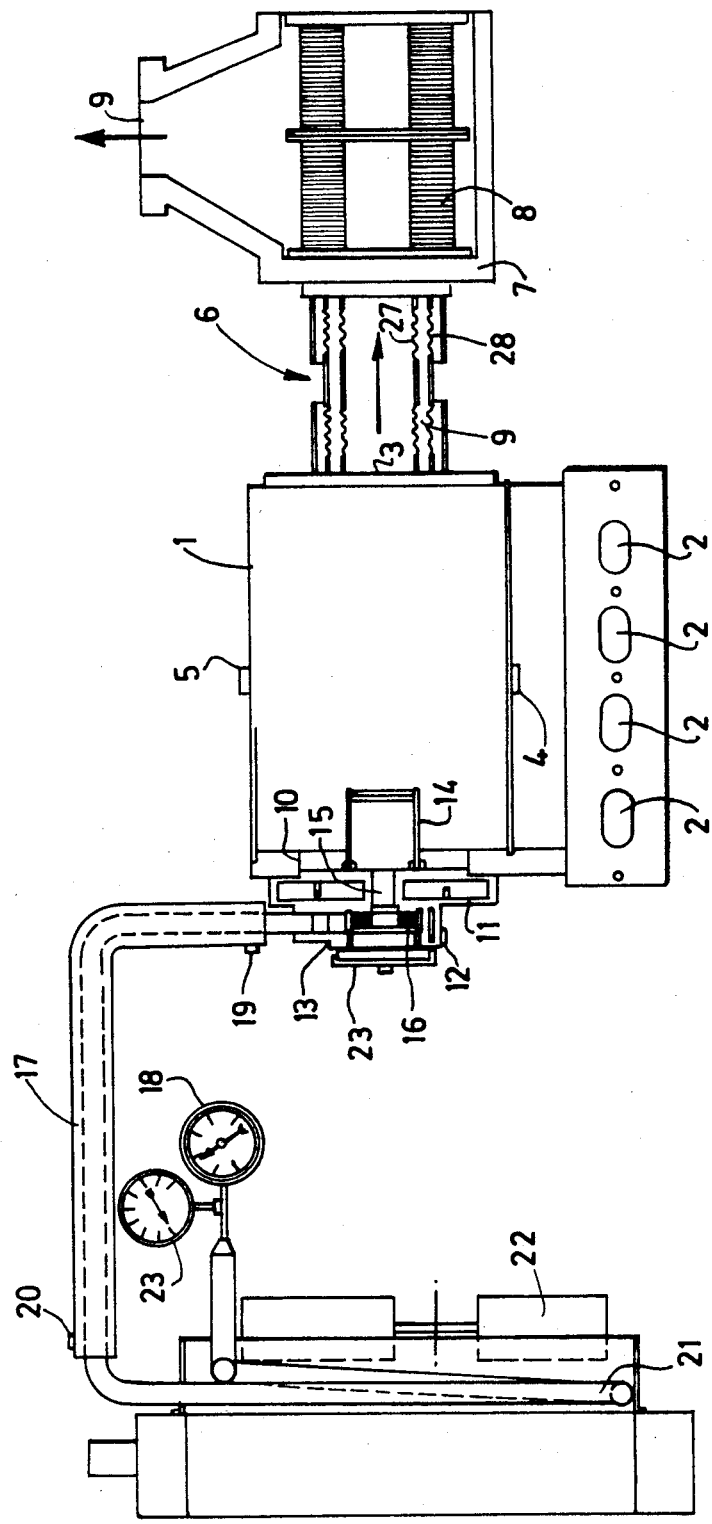

EXHAUST SYSTEM FOR THE COMBUSTION GASES OF AN INTERNAL COMBUSTION ENGINE

BACKGROUND OF THE INVENTION

1. Field of the Invention

The present invention relates to a system for exhausting the combustion gases of an internal combustion engine, comprising an exhaust manifold, means for exhausting said gases, connected to said manifold and likely to clog, and a pressure sensor communicating with said manifold.

2. Description of the Prior Art

Such a system is already known described in the patent application No. GB-A-2 134 408. In this system, the internal combustion engine is a diesel engine for a motor vehicle, and the means for exhausting the combustion gases comprise a filter, made from ceramics or a metal grid, for retaining the particles contained in said gases. After a certain time, the amount of particulates retained in such that the filter finishes by clogging. This results in a rise of the pressure of the gases in the exhaust manifold, as well as in the cylinders of the engine, called "back pressure". When this back pressure exceeds a certain threshold, specified by the constructor of the engine, the combustion is poor and causes a loss of power.

It is then necessary to regenerate the filter, that is to say, here, to free it of the particulates which clog it, by subjecting it to a flow of very hot gas, at a temperature greater than 550° C. With the pressure sensor, it is possible to proceed with the regeneration of the filter as soon as the back pressure in the exhaust manifold exceeds a given threshold, i.e. at the optimum time, having regard to the clogging of the filter.

A similar problem arises for the flame proof exhaust systems for internal combustion engines used in particular on oil drilling platforms. Thus, there exists such a system in which the means for removing the exhaust gases are flame proof and comprise for example a stack of washers which may become clogged. Such a stack, described in French Pat. No. FR-1 498 492 is formed of bored washers of appropriate thickness and spacing. Its function is in particular to laminate the exhaust gases and extinguish the incandescent carbon particles which they contain. It finishes therefore by being clogged up after a varying time. In this system, which does not comprise any pressure sensor communicating with the exhaust manifold, the flame proof stack is changed systematically after a time sufficiently short for it to be certain that the stack has not yet become too clogged, which has the following disadvantages: on the one hand, it may thus be necessary to replace the stacks too often, which results in a loss of time and, on the other hand, the replacement of the stack takes a certain time, during which the engine is shut down, which is costly, in particular an oil drilling platforms where these flame proof systems are used. Finally, experience shows that the operator tends to be negligent and not to replace and maintain the stack as required.

To overcome these disadvantages the teaching of the patent application No. GB-A-2 134 408 may of course be used for attempting to measure the back pressure of the combustion gases inside the exhaust manifold by means of a pressure sensor.

Unfortunately, because of the very high and fluctuating temperature of the combustion gases in engines for oil platforms and of the incandescent particles which they contain, it is not possible to use a conventional type membrane pressure sensor, as the one used in the patent application No. GB-A-2 134 408. A special sensor must therefore be used, of a high cost price, provided that it is feasible.

In addition, the output of such a sensor is generally electric. Now, the rules and recommendations concerning flameproof enclosures are very strict concerning the electric voltages and currents in their vicinity, which introduces an additional constraint.

A practical solution consists in forming an opening in the exhaust manifold, opening into a duct placing it in communication with a pressure sensor, situated in a less disturbed environment.

In this case, however, the rules and recommendations concerning flame proof enclosures are no longer respected.

The present invention overcomes the preceding problems.

SUMMARY OF THE INVENTION

For this it provides an exhaust system of the above defined type, wherein said discharge means are flameproof and comprise first means for arresting the incandescent particles contained in said gases and means are provided for placing said pressure sensor in communication with said manifold, said communication means comprising second means for arresting the incandescent particles contained in said gases, disposed outside the exhaust path of said gases.

With the invention, it therefore becomes possible to control the choking up of the first flameproof discharge stack, for example, and to warn an operator that it is time to change it and decarbonize it, reducing at one and the same time the stander down time of the engine and the consumption of stacks to what is just necessary.

In this invention it is remarkable that the applicant, desiring to solve the problems set by the progressive clogging up of a first flameproof stack, surprisingly had the idea of using a second similar stack for controlling the back pressure while keeping the flameproof character on the system.

The function of the second auxiliary stack, which is to transmit the pressure, allows it to be placed outside the path of the exhaust gases so that it is not subjected to the same stresses as the first discharge stack whose main function is to discharge the gases into the free air.

Advantageously, means are provided for cooling said communication means placing said pressure sensor in communication with said manifold.

Thus, the gases in contact with the sensor are cooled and the temperature behavior constraints of the sensor are less severe. Thus a sensor of simple design may be used.

In a preferred embodiment, the pressure sensor is sensitive in a zone and a temperature sensor is provided for measuring the temperature of said gases in the vicinity of the zone of sensitivity of said pressure sensor.

Thus, the operator may be sure that the temperature of the gases is well within the range of operating temperature of the pressure sensor.

BRIEF DESCRIPTION OF THE DRAWING

The present invention will be better understood from the following description of a preferred embodiment of the system of the invention with reference to the single accompanying drawing which shows a partial sectional view of the system.

DESCRIPTION OF THE PREFERRED EMBODIMENT

The exhaust system comprises an exhaust manifold 1 in which the exhaust gases coming from the cylinders of an internal combustion engine are admitted through inlets 2 and discharged through a single outlet 3. The exhaust manifold 1 is cooled by a water circuit between an inlet 4 and an outlet 5.

The outlet 3 of the exhaust manifold 1 is connected to a cooling hose 6, comprising two concentric flexible cylincrical walls 27 and 28 between which flows a cooling fluid 9. The cooling hose 6 is connected to a case 7 comprising a stack 8 of bored washers of the type described in French Pat. No. FR 1 498 492, so that the exhaust gases pass in the spaces provided between the washers of stack 8 before being discharged into the free air through an outlet 9.

The exhust manifold 1, cooling hose 6, case 7 and stack 8 are dimensioned so as to respect the rules and recommendations concerning flameproof enclosures.

The exhaust manifold 1 comprises, at the end opposite its outlet 3, an opening 10 in which is fitted a case 11, cooled by a water circuit between an inlet 12 and an outlet 13.

In case 11 is fitted an exhaust carbon deposit filter 14, disposed in the path between the inside of the exhaust manifold 1 and a channel 15 formed in the center of case 11. The end of channel 15 opposite the end situated on the same side as the exhaust manifold 1 communicates with the inside of a stack 16 of similar design to that of stack 8, but of a reduced size with respect thereto. A part 23, protecting stack, 16 closes case 11.

Case 11, stack 16 and part 23 are dimensioned so as to respect the rules and regulations concerning flameproof enclosures.

The outside of stack 16 is connected to one end of a duct 17 whose other end is in communication with a pressure gauge 18. A part of duct 17, adjacent its end in communication with the outside of stack 16, is cooled by a water circuit between an inlet 19 and an outlet 20. The remaining part of duct 17, adjacent its other end in communication with the pressure gauge 18 is wound in the shape of a tore 21 and cooled by a fan 22. A thermometer 23, installed in the vicinity of the pressure gauge 18, indicates the temperature of the gas of which pressure gauge 18 measures the pressure.

Having described the structure of the system, its operation will now be described.

The back pressure inside the exhaust manifold 1 is transmitted to the pressure gauge 18 through filter 14, channel 15, stack 16 and duct 17. The function of filter 14 is to arrest the particles of exhaust carbon deposit which could clog up stack 16. In addition, since the inlet of channel 15 is placed outside the discharge path of the exhaust gases these carbon particles are relatively few in number. The function of stack 16 is to serve as an obstacle for flames or sparks and to prevent them passing to the outside. The function of ducts 17 is to transmit the pressure to the pressure gauge 18 while lowering the temperature of the exhaust gases to a value compatible with a correct operation of the pressure gauge 18, through the water cooling circuit 19, 20 and the air cooling circuit 21, 22. Finally, with thermometer 23, a check can be made that operation is well within the range of operating temperatures of the pressure gauge, or a malfunction of the cooling systems may be detected.

Thus, when the discharge stack 8 becomes fouled up and before it is completely clogged, the back pressure rises inside the exhaust manifold 1. The operator is warned thereof through reading the pressure gauge 18 and may take action, thus avoiding poor combustion and a loss of pressure of the internal combustion engine.

In the preferred embodiment which has just been described, the system of the invention is further adapted for lowering the temperature of the exhaust gases, which may reach temperature of the order of 700° C., for example to a value compatible with the operation of existing pressure gauges, less than 60° C. for example.

The pressure gauge 18 and thermometer 23 may be replaced by any other pressure sensor or any other temperature sensor, respectively, and particularly by electric output sensors connected to a remote control system by a connection using sufficiently small currents so as to avoid any risk of sparks. Similarly, the cooling systems may take on other forms, such as that of a temperature exchanger with liquid, pulsed air or liquid gas cooling.

In the preferred embodiment which has just been described, the incandescent particles contained in the gases are arrested by a stack of washers, and it is also a stack which is used for placing the pressure sensor in communication with the exhaust manifold.

Naturally, the invention is not limited to the use of such stacks, and any known devices allowing the incandescent particles contained in the gases to be arrested may be used.

Finally, the described application of the invention is not limited and it may extend to other machines, such as gas, fuel turbines or any other machine.

What is claimed is:

1. An exhaust system for the combustion gases of an internal combustion engine, comprising an exhaust manifold, means for discharging said gases, connected to said manifold and likely to clog up, and a pressure sensor communicating with said manifold, wherein said discharge means are flameproof and comprise first means for arresting the particles contained in said gases and comprising means for placing said pressure sensor in communication with said manifold, said communication means comprising second means for arresting the incandescent particles contained in said gases, disposed outside the discharge means of said gases.

2. The system as claimed in claim 1, wherein means are provided for cooling said means placing said pressure sensor in communication with said manifold.

3. The system as claimed in claim 2, wherein said cooling means are fluid flow means.

4. The system as claimed in one of claims 2 and 3, wherein said pressure sensor is sensitive in a predetermined temperature range and a temperature sensor is provided for measuring the temperature of said gases in the vicinity of said pressure sensor.

5. The system as claimed in claim 1, wherein an electronic control system is provided, said pressure sensor being a sensor delivering an electric output signals connected to said electronic control system.

6. The system as claimed in claim 4, wherein an electronic control system is provided, said pressure sensor and said temperature sensor being sensors delivering electric output signals connected to said electronic control system.

\* \* \* \* \*